(12) United States Patent
Kanbara

(10) Patent No.: US 10,848,926 B2
(45) Date of Patent: Nov. 24, 2020

(54) COMMUNICATION APPARATUS, COMMUNICATION METHOD AND COMMUNICATION SYSTEM

(71) Applicant: SONY CORPORATION, Tokyo (JP)

(72) Inventor: Hirofumi Kanbara, Chiba (JP)

(73) Assignee: SONY CORPORATION, Tokyo (JP)

( * ) Notice: Subject to any disclaimer, the term of this patent is extended or adjusted under 35 U.S.C. 154(b) by 102 days.

(21) Appl. No.: 15/580,044

(22) PCT Filed: May 12, 2016

(86) PCT No.: PCT/JP2016/064189
§ 371 (c)(1),
(2) Date: Dec. 6, 2017

(87) PCT Pub. No.: WO2016/203877
PCT Pub. Date: Dec. 22, 2016

(65) Prior Publication Data
US 2018/0302757 A1 Oct. 18, 2018

(30) Foreign Application Priority Data

Jun. 15, 2015 (JP) .................. 2015-120537

(51) Int. Cl.
*H04W 4/08* (2009.01)
*H04W 12/00* (2009.01)
*H04W 4/80* (2018.01)
*H04B 1/713* (2011.01)
(Continued)

(52) U.S. Cl.
CPC .............. *H04W 4/08* (2013.01); *H04B 1/713* (2013.01); *H04L 63/06* (2013.01); *H04L 65/60* (2013.01);
(Continued)

(58) Field of Classification Search
None
See application file for complete search history.

(56) References Cited

U.S. PATENT DOCUMENTS

| 2002/0028658 A1 | 3/2002 | Ami et al. |
| 2007/0037567 A1* | 2/2007 | Ungless ................. G06Q 50/12 |
| | | 455/422.1 |

(Continued)

FOREIGN PATENT DOCUMENTS

| EP | 1185012 A2 | 3/2002 |
| JP | 2002-152212 A | 5/2002 |

(Continued)

OTHER PUBLICATIONS

International Search Report and Written Opinion of PCT Application No. PCT/JP2016/064189, dated Aug. 2, 2016, 08 pages of ISRWO.

*Primary Examiner* — Thomas J Dailey
(74) *Attorney, Agent, or Firm* — Chip Law Group

(57) ABSTRACT

Information is transferred to a plurality of machines without causing any delay by using a wireless communication scheme for performing one-to-one communication. According to the present disclosure, a communication apparatus includes: a streaming information reception unit configured to receive streaming information from a streaming information transmission device An address information transmission unit configured to transmit address information for identifying the streaming information transmission device to an interception device to cause the interception device to intercept predetermined information for receiving the streaming information transmitted from the streaming information transmission device.

17 Claims, 11 Drawing Sheets

(51) Int. Cl.
 *H04L 29/06* (2006.01)
 *H04W 84/20* (2009.01)
 *H04W 84/10* (2009.01)

(52) U.S. Cl.
 CPC ........... *H04W 4/80* (2018.02); *H04W 12/001* (2019.01); *H04W 84/10* (2013.01); *H04W 84/20* (2013.01)

(56) References Cited

U.S. PATENT DOCUMENTS

| | | | | |
|---|---|---|---|---|
| 2008/0095183 | A1* | 4/2008 | Bijwaard | H04L 12/185 370/432 |
| 2013/0337739 | A1* | 12/2013 | Bernsen | H04L 63/0884 455/7 |
| 2014/0206290 | A1* | 7/2014 | Lee | H04W 8/005 455/41.2 |
| 2014/0220894 | A1* | 8/2014 | Chen | H04W 8/005 455/41.2 |
| 2015/0111499 | A1* | 4/2015 | Robert | G06F 11/3051 455/41.2 |
| 2016/0316051 | A1* | 10/2016 | Hsieh | H04M 1/7253 |

FOREIGN PATENT DOCUMENTS

| | | |
|---|---|---|
| JP | 2003-224677 A | 8/2003 |
| JP | 2007-067867 A | 3/2007 |
| JP | 2010-178054 A | 8/2010 |

* cited by examiner

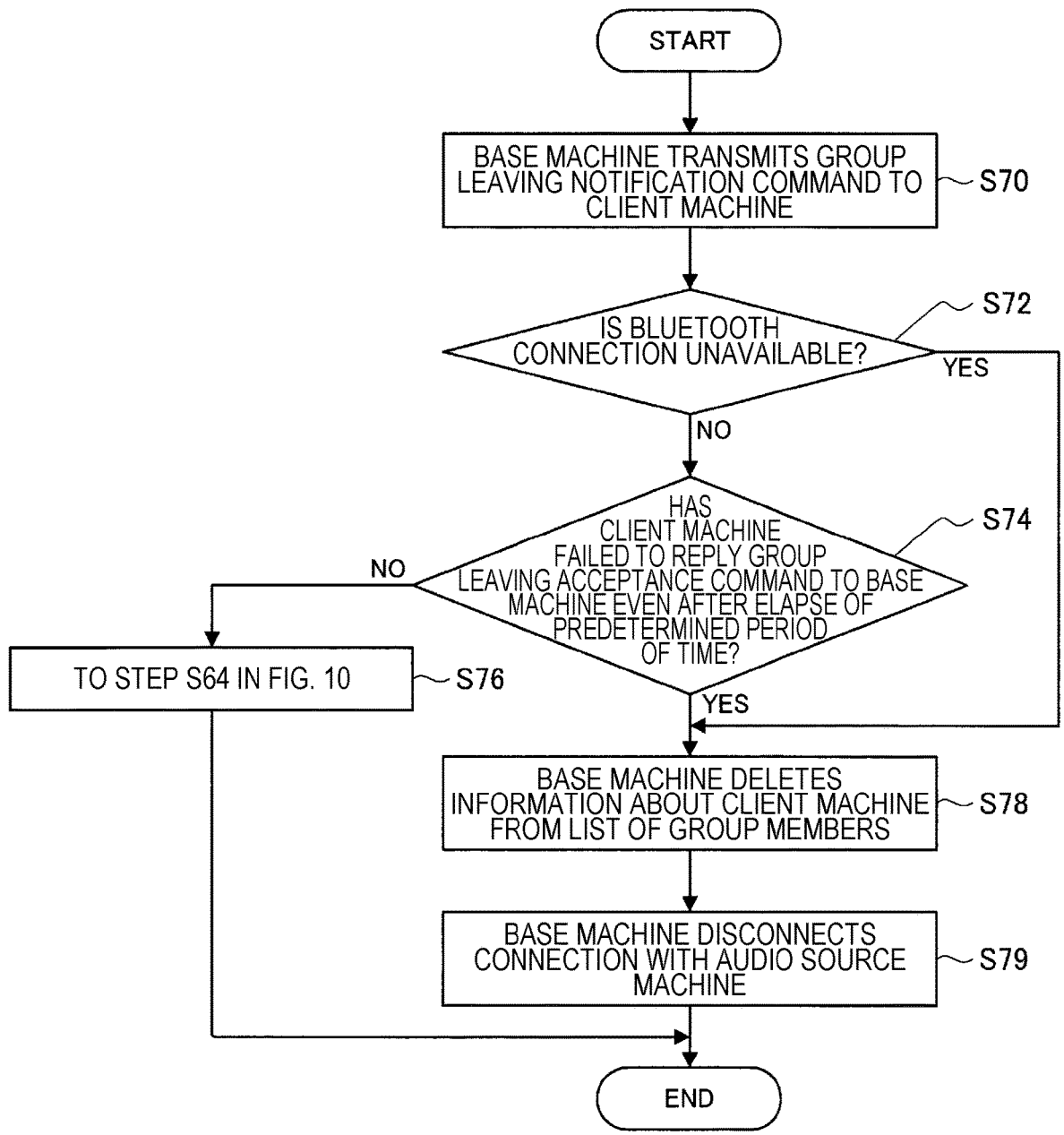

COMMUNICATION APPARATUS, COMMUNICATION METHOD AND COMMUNICATION SYSTEM

CROSS REFERENCE TO RELATED APPLICATIONS

This application is a U.S. National Phase of International Patent Application No. PCT/JP2016/064189 filed on May 12, 2016, which claims priority benefit of Japanese Patent Application No. JP 2015-120537 filed in the Japan Patent Office on Jun. 15, 2015. Each of the above-referenced applications is hereby incorporated herein by reference in its entirety.

TECHNICAL FIELD

The present disclosure relates to a communication apparatus, a communication method, a program, and a communication system.

BACKGROUND ART

For example, Patent Literature 1 below describes that a master device and a slave device are connected to each other by a wireless communication scheme based on the Bluetooth (registered trademark) standard and the slave device is further connected as a master device of the following Piconet, as a related art.

CITATION LIST

Patent Literature

Patent Literature 1: JP 2007-67867A

DISCLOSURE OF INVENTION

Technical Problem

However, the technology described in Patent Literature 1 has a problem that transfer delay occurs until information is transferred to a machine at a terminal though it is possible to transfer information to a plurality of machines by connecting Bluetooth machines, which performs one-to-one communication, in a sequential manner.

Also, the Bluetooth specification (Core ver. 4.2) in the related art defines as a basis that one-to-one connection is established between two devices and necessary data is transmitted and received. Therefore, there is a problem that audio source machine has to establish a plurality of one-to-one links for the respective audio receiver machines in order that the one audio source machine establishes a Bluetooth connection with the plurality of audio receiver machines and performs streaming communication therewith. In such a case, the audio source machine should execute and manage one-to-one link processing a number of times corresponding to the number of the counterpart machines (audio receiver machines), necessary resources (the necessary CPU processing speed and amount of memory) increases in proportion to an increase in the number of the counterpart machines, and complexity of the processing also increases. If broadcasting communication for communication with multiple counterpart machines is also defined in the specification of Bluetooth, the link processing does not increase in proportion to the number of the counterpart machines. However, since the one-to-one communication of Bluetooth or the like is for transmitting data from one machine to unspecified many counterpart machines, this is unsuitable for performing streaming communication only to counterpart machines in a group.

Thus, there has been a requirement for transferring information to a plurality of machines without causing any delay by using a wireless communication scheme for performing one-to-one communication.

Solution to Problem

According to the present disclosure, there is provided a communication apparatus including: a streaming information reception unit configured to receive streaming information from a streaming information transmission device; and an address information transmission unit configured to transmit address information for identifying the streaming information transmission device to an interception device to cause the interception device to intercept predetermined information for receiving the streaming information transmitted from the streaming information transmission device.

In addition, according to the present disclosure, there is provided a communication method including: receiving streaming information from a streamlining information transmission device; and transmitting address information for identifying the streaming information transmission device to an interception device to cause the interception device to intercept predetermined information for receiving the streaming information transmitted from the streaming information transmission device.

In addition, according to the present disclosure, there is provided a program for causing a computer to function as: a means for receiving streaming information from a streaming information transmission device; and a means for transmitting address information for identifying the streaming information transmission device to an interception device to cause the interception device to intercept predetermined information for receiving the streaming information transmitted from the streaming information transmission device.

In addition, according to the present disclosure, there is provided a communication apparatus including: a reception unit configured to receive predetermined information, which is for receiving streaming information, from a streaming information transmission device that transmits the streaming information to a streaming information reception device; and a streaming information reception unit configured to receive the streaming information, which has been transmitted by the streaming information transmission device to the streaming information reception device, by using the predetermined information.

In addition, according to the present disclosure, there is provided a communication method including: receiving predetermined information, which is for receiving streaming information, from a streaming information transmission device that transmits the streaming information to a streaming information reception device; and receiving the streaming information, which has been transmitted by the streaming information transmission device to the streaming information reception device, by using the predetermined information.

In addition, according to the present disclosure, there is provided a program for causing a computer to function as: a means for receiving predetermined information, which is for receiving streaming information, from a streaming information transmission device that transmits the streaming information to a streaming information reception device; and a means for receiving the streaming information, which has been transmitted by the streaming information transmission device to the streaming information reception device, by using the predetermined information.

In addition, according to the present disclosure, there is provided a communication system including: a first communication apparatus that includes a streaming information reception unit configured to receive streaming information from a streaming information transmission device, and an address information transmission unit configured to transmit address information for identifying the streaming information transmission device to a second communication apparatus to cause the second communication apparatus to intercept predetermined information for receiving the streaming information transmitted from the streaming information transmission device; and the second communication apparatus that includes an address information reception unit configured to receive the address information for identifying the streaming information transmission device from the first communication apparatus, a reception unit configured to receive the predetermined information, which is for receiving the streaming information, from the streaming information transmission device, and a streaming information reception unit configured to receive the streaming information, which has been transmitted by the streaming information transmission device to the first communication apparatus, by using the predetermined information.

Advantageous Effects of Invention

According to the present disclosure, it is possible to transfer information to a plurality of machines without causing any delay by using a wireless communication scheme for performing one-to-one communication as described above.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is a block diagram illustrating processing in a case of dropping out of a group.

MODE(S) FOR CARRYING OUT THE INVENTION

Figure 1:
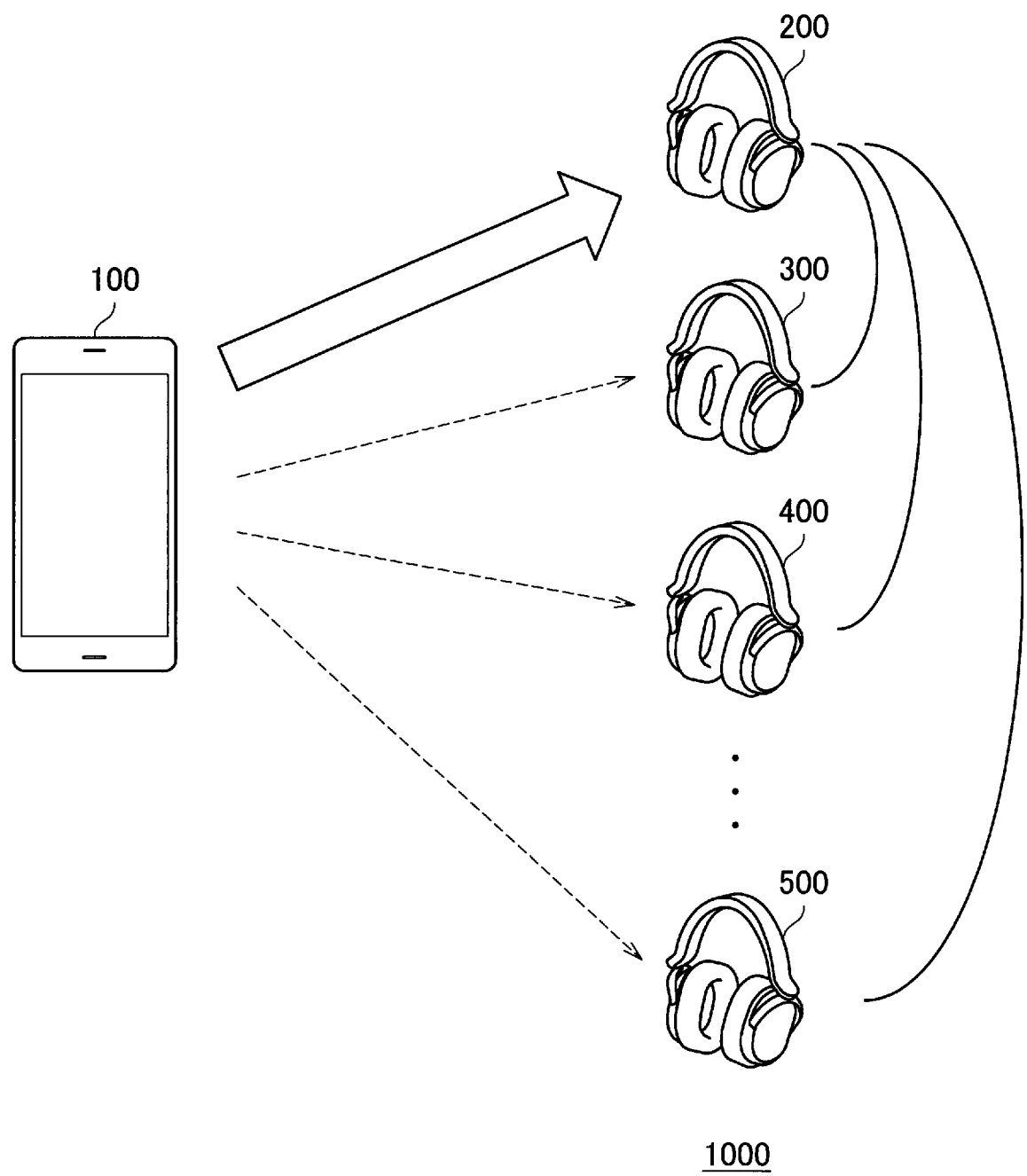
FIG. 1 is a diagram schematically illustrating an outline configuration of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Configuration example of system
2. Execution of group formation processing
3. Execution of group connection preparation processing
4. Execution of group connection processing
5. Configuration examples of base machine and client machine
6. Operations when group formation processing is performed
7. Operations when group connection preparation processing is performed
8. Data deletion method in case of dropping out of group
9. Processing in case of dropping out of group and rejoining group
1. Configuration Example of System First, an outline configuration of a system 1000 according to an embodiment of the present disclosure will be described with reference to FIG. 1. As illustrated in FIG. 1, the system 1000 according to the embodiment of the present disclosure includes one audio source machine 100 and a plurality of audio receiver machines 200, 300, 400, and 500. Although FIG. 1 illustrates four audio receiver machines 200, 300, 400, and 500, the number of the audio receiver machines 200, 300, 400, and 500 is not particularly limited. In this system 1000, the plurality of receiver machines 200, 300, 400, and 500 in a group simultaneously share and listen to the same music by performing audio streaming communication of music data saved in the one audio source machine 100 (an audio player, a smartphone, or the like) to the plurality of audio receiver machines 200, 300, 400, and 500 (headphones, speakers, or the like) that belong to the same group by a wireless communication scheme based on the Bluetooth standard, as a use case. Since the streaming communication is not performed to unspecified many audio receiver machines 200, 300, 400, and 500 at this time unlike broadcasting, it is possible to cause the limited group to share the same music. Although an example in which audio streaming data such as music is transmitted from the audio source machine 100 to the plurality of audio receiver machines 200, 300, 400, and 500 will be shown in the embodiment, other data may be transmitted.

The audio source machine 100 is a machine such as an audio player or a smartphone while the plurality of audio receiver machines 200, 300, 400, and 500 are machines such as headphones, speakers, or smartphones.

The plurality of audio receiver machines 200, 300, 400, and 500 belong to the same group, and the one audio receiver machine 200 that serves as a base machine and the other audio receiver machines 300, 400, and 500 that serve as client machines are present in the group.

The audio source machine 100 recognizes and connects to only the audio receiver machine 200, which is the base machine, as a connection target by a wireless communication scheme based on the Bluetooth standard and performs streaming communication of audio data with the audio receiver machine 200 in the form of one-to-one communication. The audio receiver machines 300, 400, and 500, which are the other client machines, acquire the audio data by intercepting the streaming communication from the audio source machine 100 to the audio receiver machine 200, which is the base machine, and reproduce the same music as that reproduced by the audio receiver machine 200, which is the base machine.

The plurality of audio receiver machines 200, 300, 400, and 500 in the same group can streaming-reproduce and share the common music data by performing the streaming communication from the one audio source machine 100 to the audio receiver machine 200, which is the base machine, and intercepting the streaming communication by the other audio receiver machines 300, 400, and 500, which are the client machines. In the embodiment, this state will be referred to as a group streaming reproduction state.

In this manner, users of the respective audio receiver machines 200, 300, 400, and 500 can listen to the common music in a case in which the audio receiver machines 200, 300, 400, and 500 are headphones, for example.

In the group streaming reproduction state, one-to-one communication is performed between the audio source machine 100 and the audio receiver machine 200, which is the base machine, by the wireless communication scheme based on the Bluetooth standard. Meanwhile, it is not necessary for the respective audio receiver machines 300, 400, and 500, which are the client machines, to provide links for one-to-one communication with the audio source machine 100. Therefore, it is possible to share the common music data by the simple method unlike a method of performing streaming distribution to unspecified many terminals by using a way such as broadcasting. Also, since it is not necessary for the respective audio receiver machines 300, 400, and 500 to provide links for one-to-one communication with the audio source machine 100, a band for the streaming distribution can be considerably reduced.

Content of processing by the audio source machine 100 and the plurality of audio receiver machines 200, 300, 400, and 500 to reach the group streaming reproduction state from a state in which connection is not established to each other is as follows. Hereinafter, the processing until the group streaming reproduction state is reached will be classified into three stages, namely, execution of group formation processing, execution of group connection preparation processing, and execution of group connection processing, and will be described in detail. The following description will be given on the assumption that three audio receiver machines 200, 300, and 400 among the audio receiver machine 200, 300, 400, and 500 form a group.

2. Execution of Group Formation Processing

Figure 2:
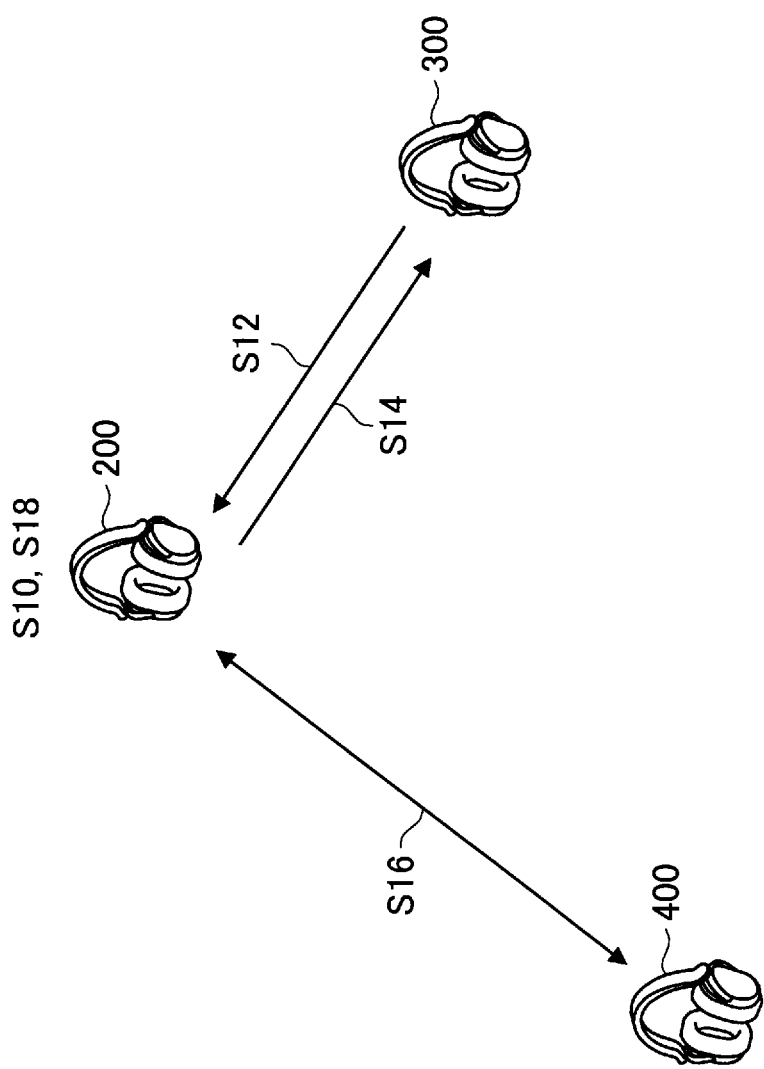
FIG. 2 is a diagram schematically illustrating a state in which group formation processing is performed.
Figure 2:
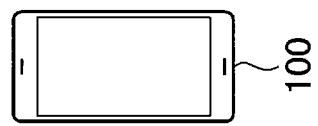
Figure 3:
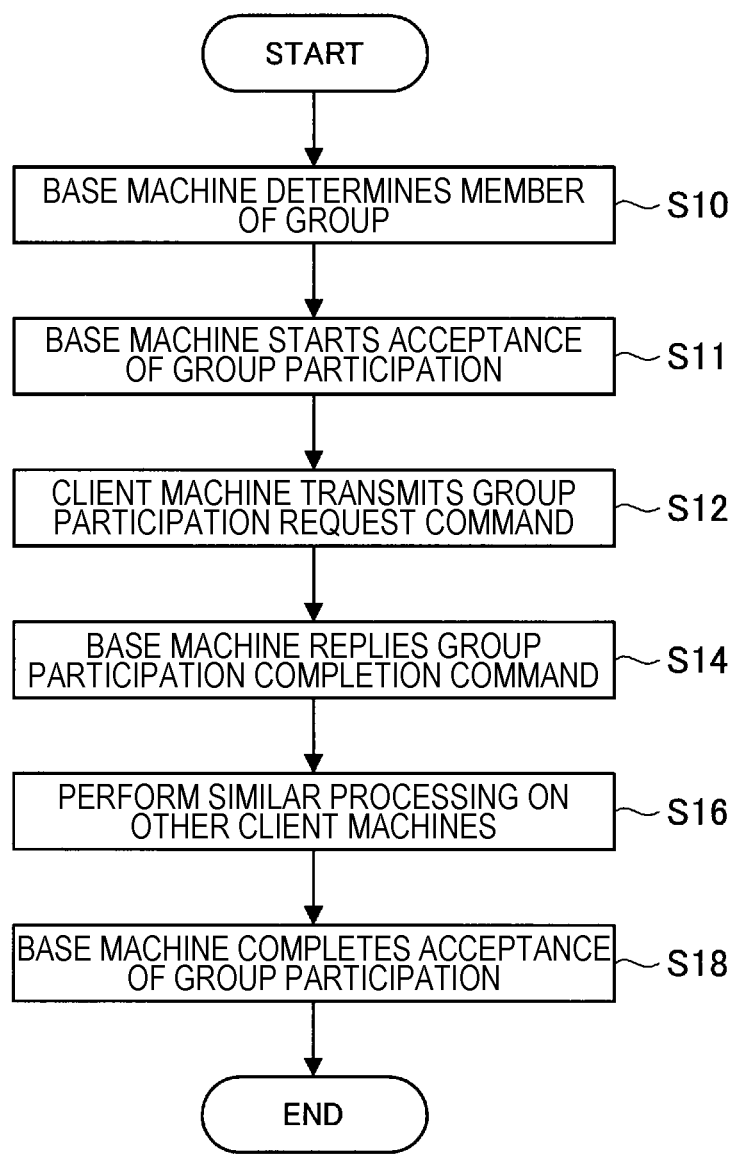
FIG. 3 is a flowchart illustrating the group formation processing.

The group formation processing will be described on the basis of FIGS. 2 and 3. FIG. 2 is a diagram schematically illustrating a state in which the group formation processing is performed, and FIG. 3 is a flowchart illustrating the group formation processing. First, the audio receiver machine 200, which is the base machine, determines two audio receiver machines 300 and 400 as members of a group (audio receiver machine group) in which streaming reproduction is shared, in Step S10.

Next, the audio receiver machine 200, which is the base machine, starts to accept the audio receiver machines 300 and 400 to join the group in Step S11.

Next, the audio receiver machine 300, which is the client machine, establishes a Bluetooth connection with the audio receiver machine 200, which is the base machine, and the audio receiver machine 300, which is the client machine, transmits a group participation request command to the audio receiver machine 200, which is the base machine, in Step S12.

Next, the audio receiver machine 200, which is the base machine, replies a group participation completion command to the audio receiver machine 300, which is the client machine, and the audio receiver machine 300, which is the client machine, disconnects the Bluetooth connection with the audio receiver machine 200, which is the base machine, in Step S14. In this manner, the audio receiver machine 200, which is the base machine, and the audio receiver machine 300, which is the client machine, recognize address information (BD_ADDR) for identifying counterparts as connection destinations.

Next, the processing similar to that in Steps S12 and S14 is also performed between the audio receiver machine 400, which is the client machine, and the audio receiver machine 200, which is the base machine, in Step S16.

Next, the audio receiver machine 200, which is the base machine, completes to accept participation of the audio receiver machines 300 and 400, which are the client machines, in the group, in Step S18. In this manner, members of the group are fixed. In this example, the three machines, namely the audio receiver machine 200, which is the base machine, and the audio receiver machines 300 and 400, which are the client machines, form the group. The audio receiver machine 200, which is the base machine, saves BD_ADDR of the audio receiver machines 300 and 400, which are the client machines, in a memory. Similarly, the audio receiver machines 300 and 400, which are the client machines, save BD_ADDR of the audio receiver machine 200, which is the base machine, in memories.

3. Execution of Group Connection Preparation Processing

Figure 4:
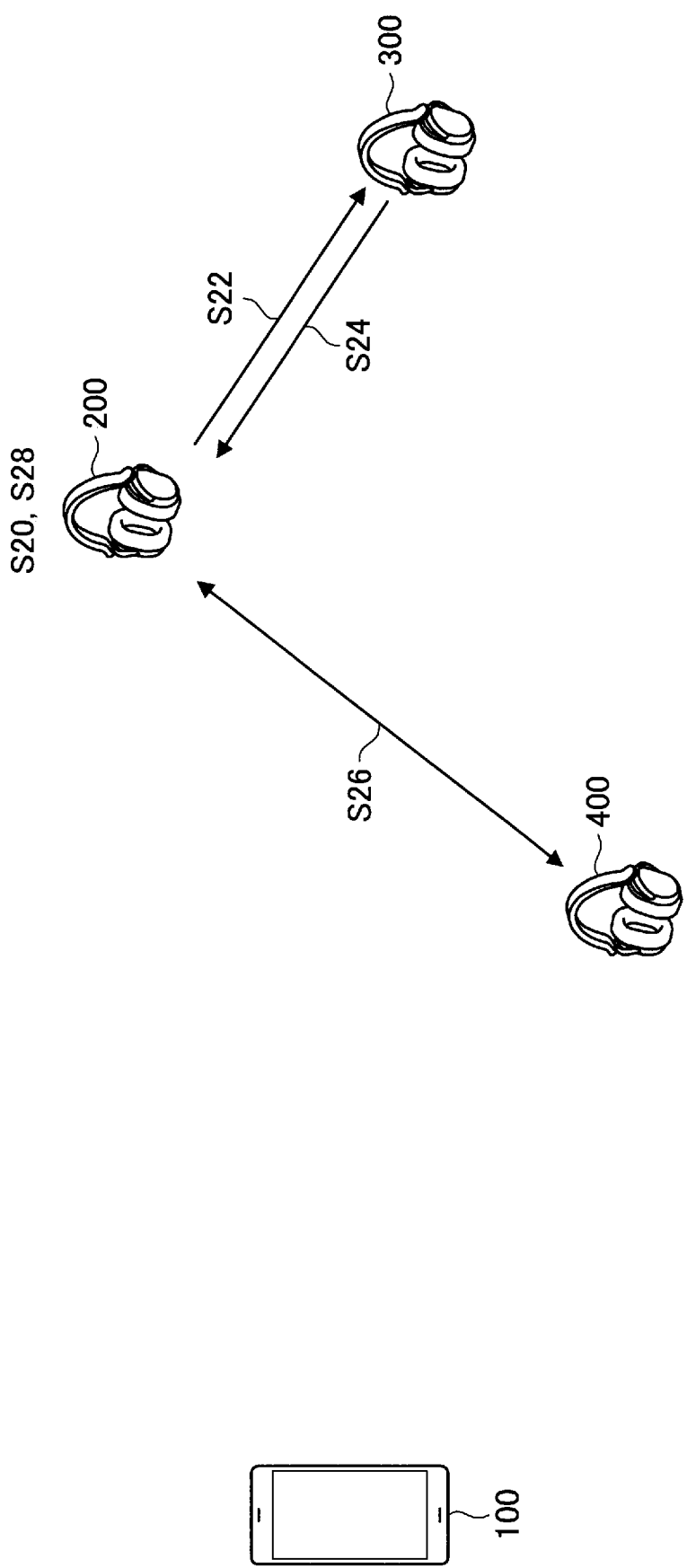
FIG. 4 is a diagram schematically illustrating a state in which group connection preparation processing is performed.
Figure 5:
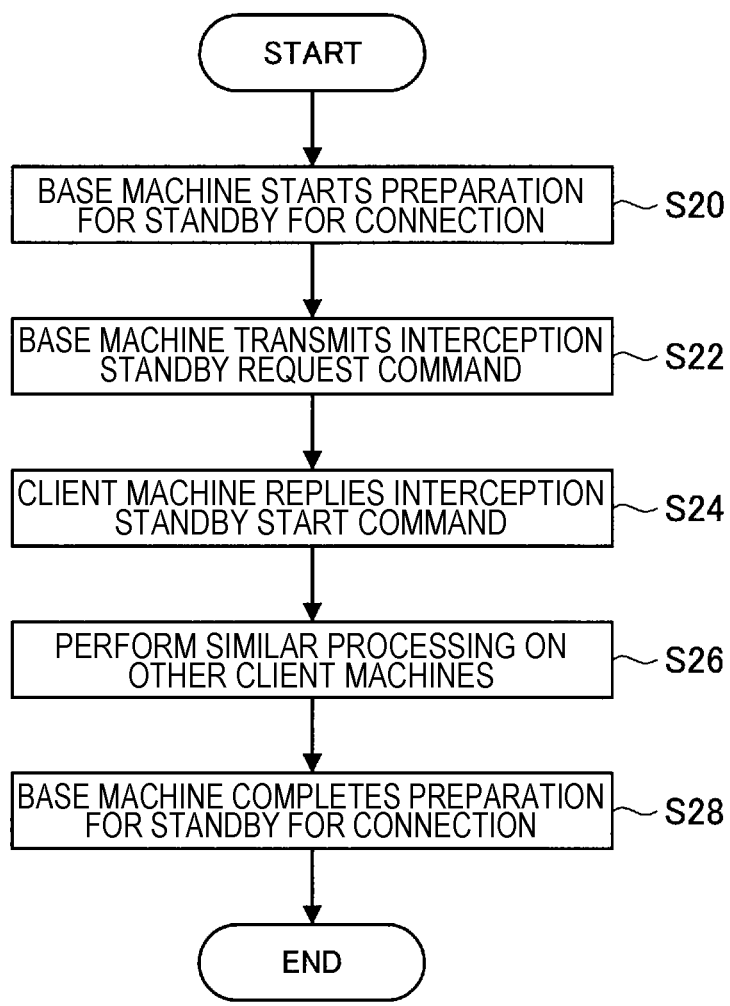
FIG. 5 is a flowchart illustrating the group formation processing.

The group connection preparation processing will be described on the basis of FIGS. 4 and 5. FIG. 4 is a diagram schematically illustrating a state in which the group connection preparation processing is performed, and FIG. 5 is a flowchart illustrating the group formation processing. In the group connection preparation processing, preparation for the following group connection processing is performed. Here, BD_ADDR of the audio source machine 100 that stands by for connection is shared in the group.

First, the audio receiver machine 200, which is the base machine, starts to prepare for standing by for connection in Step S20. Here, BD_ADDR of the audio source machine, which is a counterpart of the standby for the connection, is designated in a list of source machine information maintained in the memory of the audio receiver machine 200, which is the base machine.

Next, the audio receiver machine 200, which is the base machine, establishes a Bluetooth connection with the audio receiver machine 300, which is the client machine, and the audio receiver machine 200, which is the base machine, transmits an interception standby request command to the audio receiver machine 300, which is the client machine, in Step S22. At this time, BD_ADDR of the audio source machine 100, which is the counterpart of the standby for the interception, and a link key (Linkkey) are transmitted along with the interception standby request command.

Next, the audio receiver machine 300, which is the client machine, relies an interception standby start command to the audio receiver machine 200, which is the base machine, and the audio receiver machine 200, which is the base machine, disconnects the Bluetooth connection with the audio receiver machine 300, which is the client machine, in Step S24.

Next, the processing similar to that in Steps S22 and S24 is also performed between the audio receiver machine 400, which is the client machine, and the audio receiver machine 200, which is the base machine, in Step S26. In this manner, BD_ADDR of the audio source machine 100, which is the counterpart of the standby for the connection, and the link key are shared between the audio receiver machine 200, which is the base machine, and the audio receiver machines 300 and 400, which are the client machines. The audio receiver machine 200, which is the base machine, saves BD_ADDDR of the audio source machine 100 and the link key in the memory. Similarly, the audio receiver machines 300 and 400, which are the client machines, save BD_ADDR of the audio source machine 100 and the link key in the memories.

Next, if the audio receiver machines 300 and 400, which are the client machines, replies the interception standby start command to the audio receiver machine 200, which is the base machine, the audio receiver machine 200, which is the base machine, completes the preparation for the standby for the connection and starts to stand by for the connection in Step S28.

In the aforementioned group formation processing and group connection preparation processing, power saving communication by Bluetooth Low Energy may be performed.

4. Execution of Group Connection Processing

Figure 6:
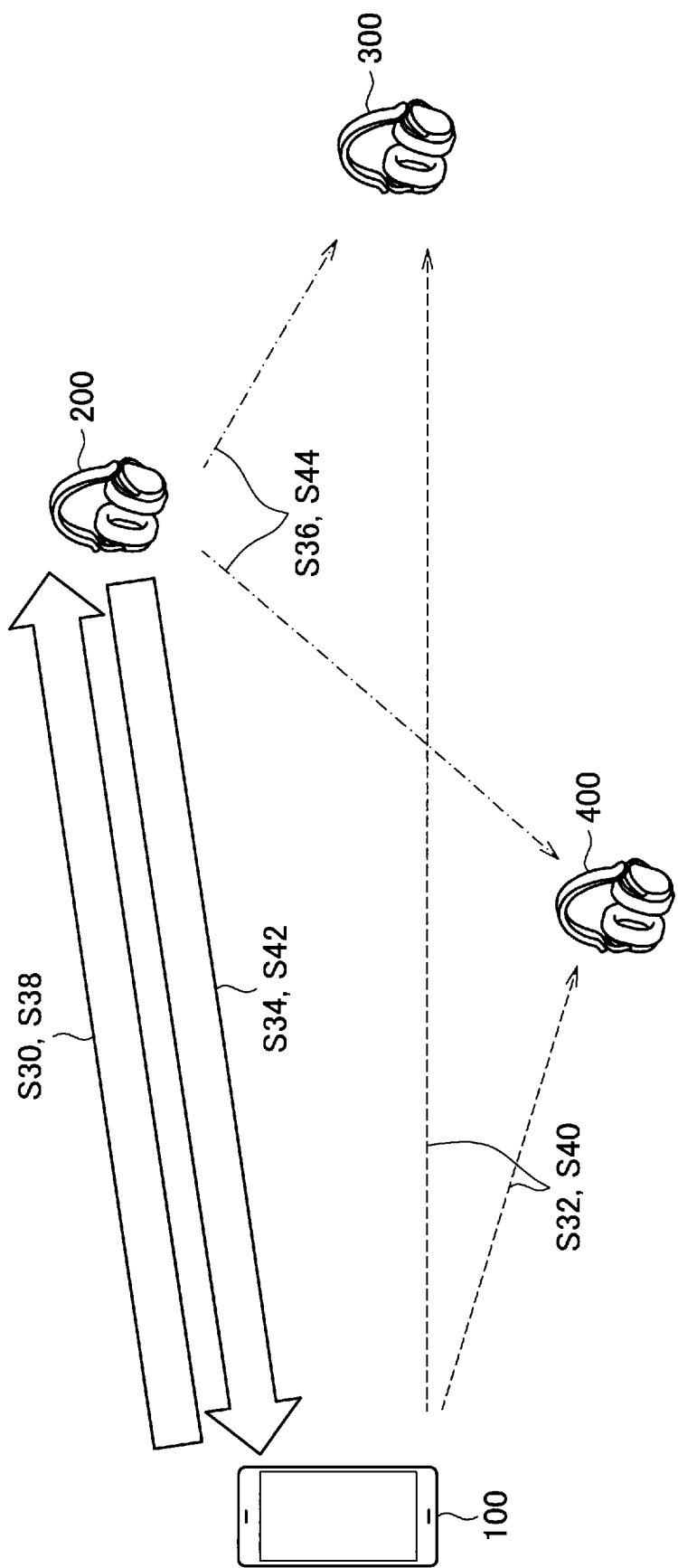
FIG. 6 is a diagram schematically illustrating a state in which group connection processing is performed.
Figure 7:
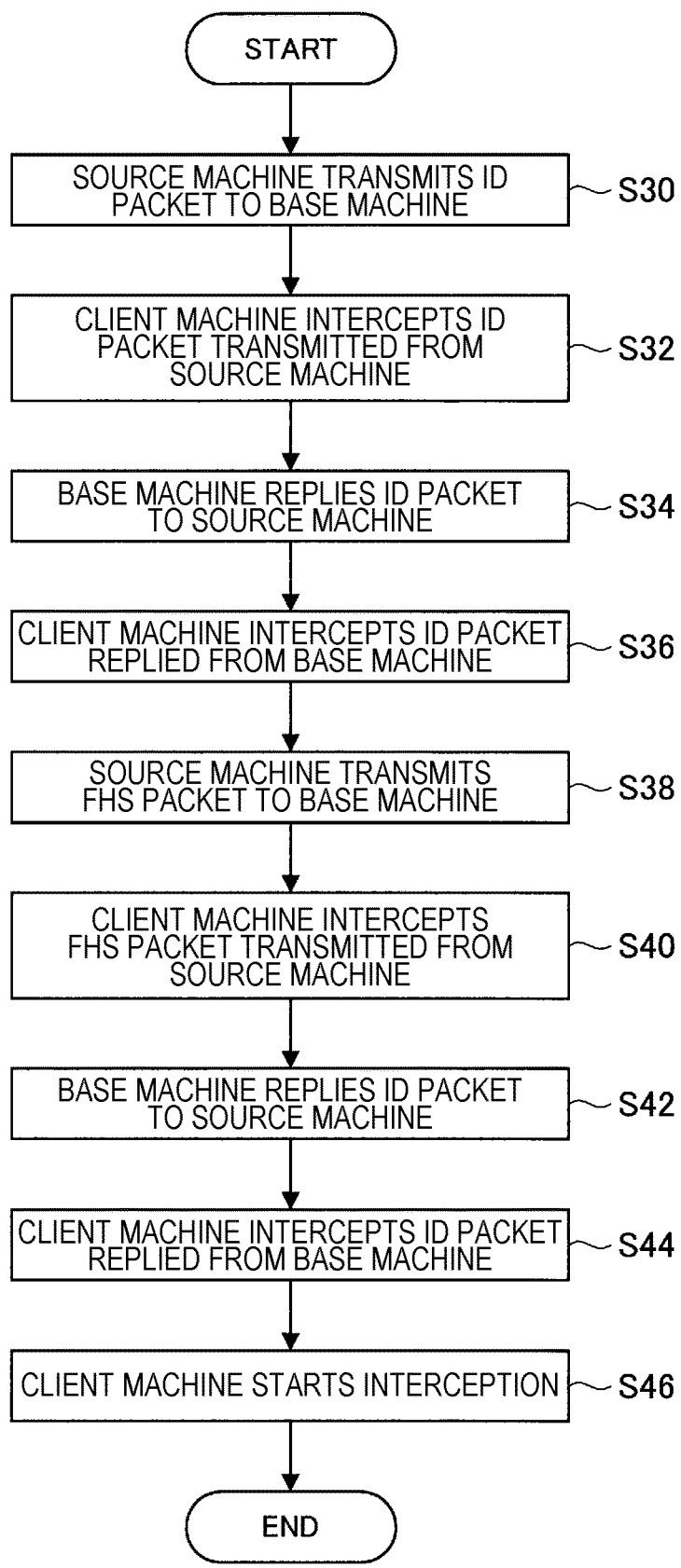
FIG. 7 is a flowchart illustrating the group formation processing.

The group connection processing will be described on the basis of FIGS. 6 and 7. FIG. 6 is a diagram schematically illustrating a state in which the group connection processing is performed, and FIG. 7 is a flowchart illustrating the group formation processing. In the group connection processing, the audio source machine 100 and the audio receiver machines 200, 300, and 400 establishes a Bluetooth connection. Here, connection between the audio source machine 100 and the audio receiver machine 200, which is the base machine, is substantially established, and the audio receiver machines 300 and 400 intercept the communication between the audio source machine 100 and the audio receiver machine 200, which is the base machine.

First, the audio source machine 100 starts a Bluetooth connection with the audio receiver machine 200, which is the base machine, and the audio source machine 100 transmits an ID packet to the audio receiver machine 200, which is the base machine. The ID packet includes BD_ADDR of the audio source machine 100.

The audio receiver machines 300 and 400, which are the client machines, intercept the ID packet that the audio source machine 100 has transmitted in Step S30 and recognize the ID packet as a connection request from the audio source machine 100 to the audio receiver machine 200, which is the base machine. At this time, the audio receiver machines 300 and 400, which are the client machines, have recognized BD_ADDR of the audio source machine 100, which is the counterpart of the standby for the connection, through the group connection preparation processing described in FIGS. 4 and 5. Therefore, in a case in which BD_ADDR included in the ID packet intercepted in Step S32 coincides with BD_ADDR which has already been recognized through the group connection preparation processing, it is possible to recognize the ID packet as the connection request from the audio source machine 100, which is the counterpart of the standby for the connection, to the audio receiver machine 200.

Next, the audio receiver machine 200, which is the base machine, replies an ID packet as a response to the Bluetooth connection request to the audio source machine 100 in Step S34. This ID packet includes BD_ADDR of the audio receiver machine 200, which is the base machine.

Next, the audio receiver machines 300 and 400, which are the client machines, intercept the ID packet that the audio receiver machine 200 has transmitted in Step S34 and recognize the ID packet as a connection response from the audio receiver machine 200, which is the base machine, to the audio source machine 100 in Step S36. Since the audio receiver machines 300 and 400, which are the client machines, have already recognized BD_ADDR of the audio receiver machine 200, which is the base machine, the audio receiver machines 300 and 400 can recognize the ID packet as the connection response from the audio receiver machine 200, which is the base machine, to the audio source machine 100 when the audio receiver machines 300 and 400 intercept the ID packet transmitted by the audio receiver machine 200 in Step S34.

Next, the audio source machine 100 starts a Bluetooth connection with the audio receiver machine 200, which is the base machine, and transmits a frequency hopping synchronization (FHS) packet in Step S38. This FHS packet includes BD_ADDR of the audio source machine 100 and a BT clock for frequency hopping synchronization (FHS) of Bluetooth.

Next, the audio receiver machines 300 and 400, which are the client machines, intercept the FHS packet that the audio source machine 100 has transmitted in Step S38 and recognize the FHS packet as a connection request from the audio source machine 100 to the audio receiver machine 200, which is the base machine, in Step S40.

Frequency hopping has been performed on streaming data transmitted from the audio source machine 100. Specifically, a frequency is hopped to any of frequencies of 79 channels at every 625 μm, for example. The FHS packet includes information (BT Clock) indicating at which timing and how the frequency is changed during the frequency hopping. Therefore, the receiver machines 300 and 400, which are the client machines, can intercept the streaming data after the frequency hopping that has been transmitted from the audio source machine 100 to the audio receiver machine 200, which is the base machine, by intercepting the FHS packet. Since the frequency is shifted to any of the frequencies of 79 channels at predetermined time interval (1.28 seconds) until the FHS packet is transmitted, it is possible to perform the communication by following the shifted frequency.

Next, the audio receiver machine 200, which is the base machine, replies an ID packet as a response to the Bluetooth connection request to the audio source machine 100 in Step S42. This ID packet includes BD_ADDR of the audio receiver machine 200, which is the base machine.

Next, the audio receiver machines 300 and 400, which are the client machines, intercept the ID packet that the audio receiver machine 200, which is the base machine, has replied in Step S42 and recognize the ID packet as a connection response from the audio receiver machine 200, which is the base machine, to the audio source machine 100 in Step S44.

Next, interception by the audio receiver machines 300 and 400, which are the client machines, is started at the same time with the completion of the connection between the audio source machine 100 and the audio receiver machine 200, which is the base machine, in Step S46. In this manner, exchange of commands specific to Bluetooth is started, and the audio source machine 100 transmits streaming data to the audio receiver machine 200, which is the base machine. If the streaming data is transmitted from the audio source machine 100, the audio receiver machine 200, which is the base machine, can receive the streaming data on the basis of BT Clock included in the FHS packet. If the streaming data is transmitted from the audio source machine 100 to the audio receiver machine 200, which is the base machine, the audio receiver machines 300 and 400, which are the client machines, can intercept the streaming data by the BT Clock included in the FHS packet. The audio receiver machines 300 and 400, which are the client machines, can ignore unnecessary commands other than the streaming data and can receive and reproduce the streaming data only when the data is intercepted.

The streaming data intercepted by the FHS packet has been encrypted. Since the audio receiver machines 300 and 400, which are the client machines, have acquired the link key (Linkkey) through the group connection preparation processing described in FIGS. 4 and 5, the audio receiver machines 300 and 400 can interpret (decrypt) the encrypted data by using Linkkey.

The audio receiver machine 200, which is the base machine, directly receives the streaming data from the audio source machine 100 and reproduces music or the like. The audio receiver machines 300 and 400, which are the client machines, reproduce the music or the like by intercepting the streaming data transmitted from the audio source machine 100 to the audio receiver machine 200. In this manner, the audio receiver machine 200, which is the base machine, and the audio receiver machines 300 and 400, which are the client machines, can share and reproduce the same music piece and perform group streaming reproduction.

5. Configuration Examples of Base Machine and Client Machine

Figure 8:
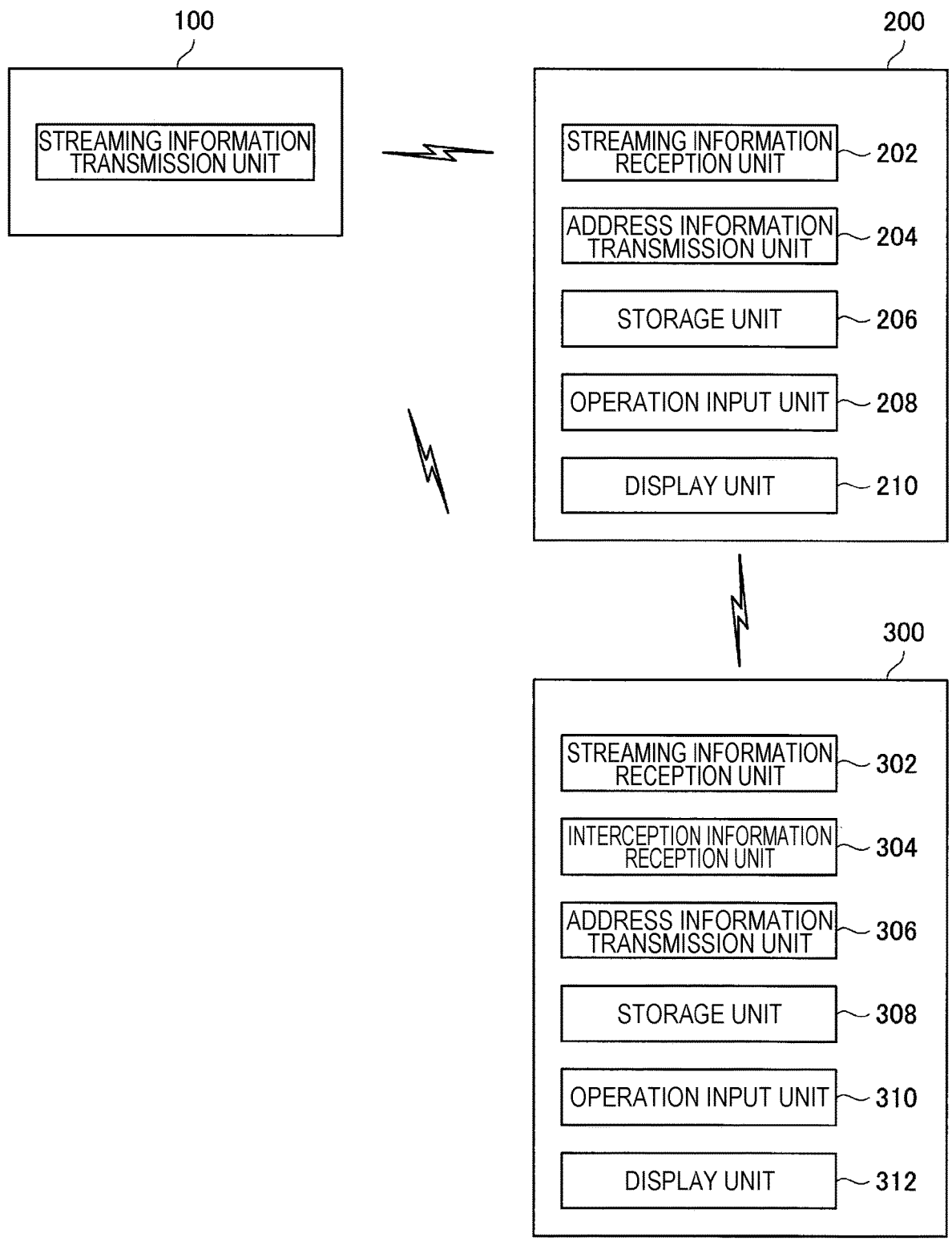
FIG. 8 is a block diagram illustrating configuration examples of an audio source machine, an audio receiver machine as a base machine, and an audio receiver machine as a client machine.

FIG. 8 is a block diagram illustrating configuration examples of the audio source machine 100, the audio receiver machine 200, which is the base machine, and the audio receiver machine 300, which is the client machine. As illustrated in FIG. 8, the audio source machine 100 includes a streaming information transmission unit 102. The audio receiver machine 200, which is the base machine, includes a streaming information reception unit 202, an address information transmission unit 204, a storage unit (memory) 206, an operation input unit 208, and a display unit 210. The audio receiver machine 300, which is the client machine, includes a streaming information reception unit 302, an interception information reception unit (reception unit) 304, an address information reception unit 306, a storage unit (memory) 308, an operation input unit 310, and a display unit 312. Configurations of the other client machines (audio receiver machines 400 and 500) are the same as that of the audio receiver machine 300. The respective components in the audio source machine 100, the audio receiver machine 200, which is the base machine, and the audio receiver machine 300, which is the client machine, as illustrated in FIG. 8 can be formed by circuits (hardware) or a central processing unit such as a CPU and a program (software) that causes the central processing unit to function. In such a case, the program can be stored in a memory provided in each machine or in a recording medium to be externally inserted into each machine.

The streaming information transmission unit 102 of the audio source machine 100 transmits the streaming data to the audio receiver machine 200, which is the base machine. The streaming information reception unit 202 of the audio receiver machine 200, which is the base machine, receives the streaming data transmitted from the audio source machine 100. As described above, BT Clock included in the FHS packet is used when the streaming data is received.

The address information transmission unit 204 of the audio receiver machine 200, which is the base machine, transmits BD_ADDR of the audio source machine 100 and the link key to the audio receiver machine 300, which is the client machine. The storage unit 206 stores BD_ADDR of the audio source machine 100, the link key, and the group member list including BD_ADDR of the client machines that belong to the group. Also, the storage unit 206 stores BT Clock and the like included in the FHS packet.

The operation input unit 208 is formed of a button, a touch sensor, or the like, and user's operations are input thereto. The display unit 210 is formed of a liquid crystal display or the like and presents display indicating that the machine is the base machine in response to an input of a user's operation.

The interception information reception unit 304 of the audio receiver machine 300, which is the client machine, receives the FHS packet as predetermined information, which is for receiving the streaming information, from the audio source machine 100. The streaming information reception unit 302 intercept the streaming information transmitted from the audio source machine 100 by using BT Clock included in the FHS packet. The address information reception unit 306 receives address information (BD_ADDR) for specifying the audio source machine 100 transmitted from the audio receiver machine 200, which is the base machine. The storage unit 308 stores BD_ADDR of the audio source machine 100 and the link key. The storage unit 308 stores BD_ADDR of the audio receiver machine 200, which is the base machine, as group participation information and stores BT Clock and the like included in the FHS packet.

The operation input unit 310 is formed of a button, a touch sensor, or the like, and user's operations are input thereto. The display unit 312 is formed of a liquid crystal display or the like and presents display indicating that the machine is a client machine in response to an input of a user's operation.

6. Operations when Group Formation Processing is Performed

In a case in which the aforementioned group formation processing is performed, the respective users who own the audio receiver machine 200 and the audio receiver machines 300 and 400 express their intention about which of the base machine and the client machine their own machine will become and perform operations in accordance with the expressed intension on the operation input unit 208 and the operation input unit 308. In one example, the user of the audio receiver machine 200 sets the audio receiver machine 200 as a base machine by performing a long pressing operation on an input button of the base machine/the client machine in the operation input unit 208. Also, the user of the audio receiver machine 300 sets the audio receiver machine 300 as a client machine by performing a short pressing operation on an input button of the base machine/the client machine in the operation input unit 308. Alternatively, the user of the audio receiver machine 200 may set the audio receiver machine 200 as the base machine by performing a short pressing operation on the input button of the base machine/the client machine in the operation input unit 208, and the user of the audio receiver machine 300 may set the audio receiver machine 300 as the client machine by performing a long pressing operation on the input button of the base machine/the client machine in the operation input unit 308.

If the audio receiver machine 200 is set as the base machine, and the audio receiver machine 300 is set as the client machine, processing in Steps S11 to S18 in the aforementioned group formation processing is sequentially performed.

The display unit 210 and the display unit 310 present display indicating which of the base machine and the client machine the respective machine have been set. The display unit 210 of the audio receiver machine 200, which is the base machine, presents display indicating that the machine is the base machine, and the display unit 310 of the audio receiver machine 300, which is the client machine, presents display indicating that the machine is the client machine.

7. Operations when Group Connection Preparation Processing is Performed

In a case in which the aforementioned group connection preparation processing is performed, BD-ADDR of the audio source machine 100, which is the counterpart of the standby for the connection, is designated by the user of the audio receiver machine 200, which is the base machine, selecting the audio source machine 100 in the list of the source machine information displayed on the display unit in Step S20 in FIG. 5. Thereafter, the processing in Steps S22 to S28 in the aforementioned group connection preparation processing is sequentially performed.

The display unit 210 of the audio receiver machine 200, which is the base machine, and the display unit 310 of the audio receiver machine 300, which is the client machine, may present display indicating that the counterpart of the standby for the connection is the audio source machine 100.

8. Data Deletion Method in Case of Dropping Out of Group

Next, a data deletion method in a case in which the audio receiver machines 300 and 400 as client machines drop out of the group will be described. The audio receiver machines 300 and 400, which are the client machines can drop out of the group of the group streaming at an arbitrary timing. In such a case, the information such as BD_ADDR, the FHS packet, and the link key maintained in the audio receiver machine 200, which is the base machine, and the audio receiver machines 300 and 400, which are the client machines, is deleted. Deletion methods include (1) a method in which the audio receiver machine 200 as the base machine and the audio receiver machines 300 and 400 as the client machines respectively delete the data on the basis of a leaving notification from the client machines to the base machine, (2) a method in which the audio receiver machine 200 as the base machine and the audio receiver machines 300 and 400 as the client machines respectively delete the data on the basis of a leaving notification from the base machine to the client machine, and (3) a method in which only the audio receiver machine 200 as the base machine delete the data. Hereinafter, a case in which the audio receiver machine 300 as the client machine drops out of (leaves) the group will be described.

Figure 9:
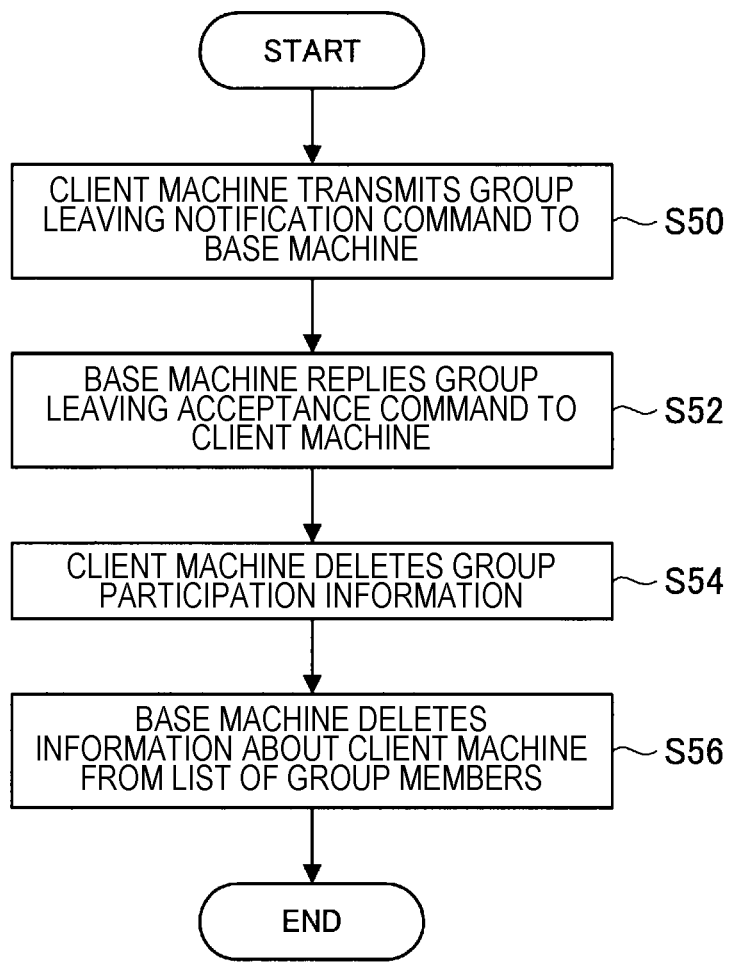
FIG. 9 is a block diagram illustrating processing in a case of dropping out of a group.

In the aforementioned method (1), the audio receiver machine 300, which is the client machine, transmits a group leaving notification first. The audio receiver machine 200, which is the base machine, also updates group data and removes the audio receiver machine 300 from the members of the group. Hereinafter, detailed description will be given on the basis of the flowchart in FIG. 9.

First, the audio receiver machine 300, which is the client machine, establishes a Bluetooth connection with the audio receiver machine 200, which is the base machine, and the audio receiver machine 300, which is the client machine, transmits a group leaving notification command to the audio receiver machine 200, which is the base machine, in Step S50.

The audio receiver machine 200, which is the base machine, replies a group leaving acceptance command to the audio receiver machine 300, which is the client machine, and the audio receiver machine 300, which is the client machine, disconnects the Bluetooth connection with the audio receiver machine 200, which is the base machine, in the following Step S52. It is assumed that no refusal response is made to the group leaving notification command.

The audio receiver machine 300, which is the client machine, deletes group participation information of the group that includes the audio receiver machine 200 as a head member, to which the group leaving notification command is transmitted, in the following Step S54.

The audio receiver machine 200, which is the base machine, deletes the information about the audio receiver machine 300, from which the group leaving notification command is transmitted, from the list of the group members in the following step S56.

Next, in the aforementioned method (2), the audio receiver machine 300, which is the client machine, also deletes the data on the basis of transmission of the group leaving notification from the audio receiver machine 200, which is the base machine. In this manner, the group information of the audio receiver machine 200, which is the base machine, is cleared. Hereinafter, detailed description will be given on the basis of the flowchart in FIG. 10.

First, the audio receiver machine 200, which is the base machine, establishes a Bluetooth connection with the audio receiver machine 300, which is the client machine, and the audio receiver machine 200, which is the base machine, transmits a group leaving notification command to the audio receiver machine 300, which is the client machine, in Step S60.

The audio receiver machine 300, which is the client machine, replies a group leaving acceptance command to the audio receiver machine 200 which is the base machine, and the audio receiver machine 200, which is the base machine, disconnects the Bluetooth connection with the audio receiver machine 300, which is the client machine, in the following Step S62. It is assumed that no refusal response is made to the group leaving notification command.

The audio receiver machine 300, which is the client machine, deletes group participation information of the group that includes the audio receiver machine 200 as the base machine, from which the group leaving notification command is transmitted, in the following Step S64.

The audio receiver machine 200, which is the base machine, deletes the information about the audio receiver machine 300, to which the group leaving notification command is transmitted, from the list of the group members in the following Step S66.

In a case in which the audio receiver machine 200, which is the base machine, desires to remove a plurality of client machines from the group, the aforementioned processing in Steps S60 to S66 is repeated.

Next, in the aforementioned method (3), the following processing is performed as error cases of (1) and (2) described above in a case in which the audio receiver machine 200, which is the base machine, provides a group leaving notification, but no connection is established with the audio receiver machine 300, which is the client machine, or no reply is received from the audio receiver machine 300, which is the client machine. Hereinafter, detailed description will be given on the basis of the flowchart in FIG. 11.

First, the audio receiver machine 200, which is the base machine, establishes a Bluetooth connection with the audio receiver machine 300, which is the client machine, and the audio receiver machine 200, which is the base machine, attempts to transmit a group leaving notification command to the audio receiver machine 300, which is the client machine, in Step S70.

The audio receiver machine 200, which is the base machine, determines whether or not it is possible to establish a Bluetooth connection with the audio receiver machine 300, which is the client machine, and in a case in which it is not possible to establish the Bluetooth connection, the audio receiver machine 200 chooses time-out, gives up the Bluetooth connection therewith, and moves on to Step S78.

In contrast, in a case in which the Bluetooth connection can be established in Step S72, the processing proceeds to Step S74. It is determined whether or not the audio receiver machine 300, which is the client machine, has replied a group leaving acceptance command to the audio receiver machine 200, which is the base machine, in a predetermined period of time in Step S74. In a case in which the audio receiver machine 300, which is the client machine, has not replied the group leaving acceptance command to the audio receiver machine 200, which is the base machine, in the predetermined period of time, time-out is chosen, the Bluetooth connection with the audio receiver machine 300, which is the client machine, is disconnected, and the processing proceeds to Step S78.

Figure 10:
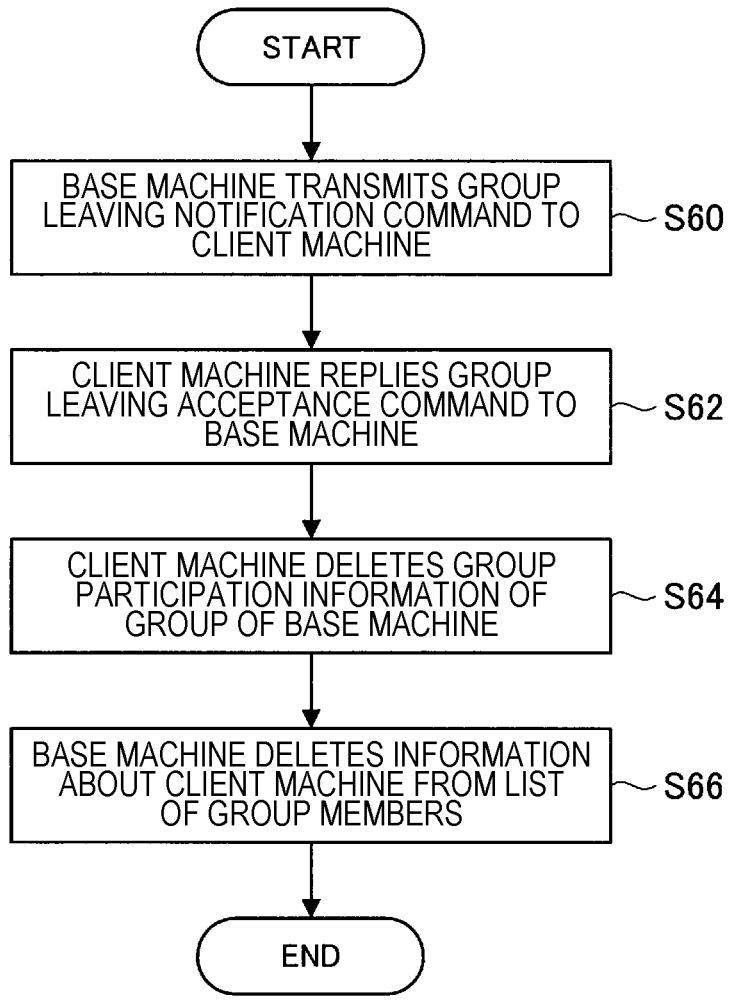
FIG. 10 is a block diagram illustrating processing in a case of dropping out of a group.

In contrast, in a case in which the audio receiver machine 300, which is the client machine, has replied the group leaving acceptance command to the audio receiver machine 200, which is the base machine, in the predetermined period of time in Step S74, the processing proceeds to Step S76, and the processing in Step S64 and the following steps in FIG. 10 is performed.

The audio receiver machine 200, which is the base machine, deletes information about the audio receiver machine 300, to which the group leaving notification command is transmitted, from the list of the group members in Step S78.

If a state after completion of the "group connection preparation processing" (including the group streaming reproduction state) has been achieved, the audio receiver machine 200, which is the base machine, disconnects the connection with the audio source machine 100 in the following Step S79.

9. Processing in Case of Dropping Out of Group and Rejoining Group

Next, processing in a case in which the audio receiver machine 300 as the client machine drops out of the group and then rejoins the group will be described.

In a case of rejoining the group after the completion of the aforementioned "group connection processing", connection between the audio source machine 100 and the audio receiver machine 200, which is the base machine, is disconnected once. At this time, interception by the other audio receiver machines 400 that have joined the group is also stopped. Thereafter, the aforementioned "group formation processing" is executed, and the audio receiver machine 300, which is the client machine, is added to the group.

Thereafter, the "group connection preparation processing" and the "group connection processing" are sequentially executed, and rejoining processing for the audio receiver machine 300, which is the client machine, is performed.

According to the embodiment, the audio source machine 100 and the audio receiver machine 200, which is the base machine, transmit and receive streaming data such as music by a wireless communication scheme based on the Bluetooth standard as described above. Meanwhile, the other audio receiver machines 300, 400, and 500, which are the client machines, acquire information for intercepting the streaming communication from the audio source machine 100 to the audio receiver machine 200, which is the base machine. In this manner, the audio receiver machines 300, 400, and 500, which are the client machines, can intercept the streaming communication from the audio source machine 100 to the audio receiver machine 200, which is the base machine, by using the information for intercepting the streaming communication. Therefore, it is possible to realize the group streaming reproduction state in which the audio receiver machine 200 as the base machine and the audio receiver machines 300, 400, and 500 as the client machines simultaneously reproduce music or the like. In this manner, it is possible to share and listen to the music or the like distributed by the one audio source machine 100 in the limited group. Also, it is possible to realize this without changing the current Bluetooth standard and to thereby achieve early realization without changing the specification.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication apparatus including:

a streaming information reception unit configured to receive streaming information from a streaming information transmission device; and an address information transmission unit configured to transmit address information for identifying the streaming information transmission device to an interception device to cause the interception device to intercept predetermined information for receiving the streaming information transmitted from the streaming information transmission device.

(2)

The communication apparatus according to (1), in which the predetermined information includes information related to frequency hopping in communication of the streaming information.

(3)

The communication apparatus according to (1) or (2), including:

an operation input unit configured to obtain an input of a user's operation, in which the address information is transmitted to a plurality of the interception devices that belong to a preset group in response to the input of the user's operation to the operation input unit.

(4)

The communication apparatus according to (3), including:

a storage unit configured to store a list of the plurality of interception devices that belong to the group, in which in a case in which at least one of the interception devices drops out of the group, the interception device which has dropped out is deleted from the list.

(5)

The communication apparatus according to any of (1) to (4), in which a link key for decrypting the encrypted streaming information is transmitted with the address information to the interception device.

(6)

The communication apparatus according to any of (1) to (5), in which the interception device receives the streamlining information, which has been transmitted by the streaming information transmission device, by using the predetermined information.

(7)

A communication method including:

receiving streaming information from a streamlining information transmission device; and transmitting address information for identifying the streaming information transmission device to an interception device to cause the interception device to intercept predetermined information for receiving the streaming information transmitted from the streaming information transmission device.

(8)

A program for causing a computer to function as:

a means for receiving streaming information from a streaming information transmission device; and a means for transmitting address information for identifying the streaming information transmission device to an interception device to cause the interception device to intercept predetermined information for receiving the streaming information transmitted from the streaming information transmission device.

(9)

A communication apparatus including:

a reception unit configured to receive predetermined information, which is for receiving streaming information, from a streaming information transmission device that transmits the streaming information to a streaming information reception device; and a streaming information reception unit configured to receive the streaming information, which has been transmitted by the streaming information transmission device to the streaming information reception device, by using the predetermined information.

(10)

The communication apparatus according to (9), in which the predetermined information includes information related to frequency hopping in communication of the streaming information.

(11)

The communication apparatus according to (9) or (10), including:

an address information reception unit configured to receive address information for identifying the streaming information transmission device from the streaming information reception device, in which the reception unit receives the predetermined information transmitted by the streaming information transmission device on the basis of the address information.

(12)

The communication apparatus according to (11), including:

an operation input unit configured to obtain an input of a user's operation, in which the streaming information reception device transmits the address information to a plurality of apparatuses that belong to a preset group in response to the input of the user's operation to the operation input unit.

(13)

The communication apparatus according to (12), including:

a storage unit configured to store information of the streaming information reception device as group participation information, in which the group participation information is deleted in a case of dropping out of the group.

(14)

The communication apparatus according to any of (11) to (13), in which a link key for decrypting the encrypted streaming information is received with the address information.

(15)

A communication method including:

receiving predetermined information, which is for receiving streaming information, from a streaming information transmission device that transmits the streaming information to a streaming information reception device; and receiving the streaming information, which has been transmitted by the streaming information transmission device to the streaming information reception device, by using the predetermined information.

(16)

A program for causing a computer to function as:

a means for receiving predetermined information, which is for receiving streaming information, from a streaming information transmission device that transmits the streaming information to a streaming information reception device; and a means for receiving the streaming information, which has been transmitted by the streaming information transmission device to the streaming information reception device, by using the predetermined information.

(17)

A communication system including:

a first communication apparatus that includes a streaming information reception unit configured to receive streaming information from a streaming information transmission device, and an address information transmission unit configured to transmit address information for identifying the streaming information transmission device to a second communication apparatus to cause the second communication apparatus to intercept predetermined information for receiving the streaming information transmitted from the streaming information transmission device; and the second communication apparatus that includes an address information reception unit configured to receive the address information for identifying the streaming information transmission device from the first communication apparatus, a reception unit configured to receive the predetermined information, which is for receiving the streaming information, from the streaming information transmission device, and a streaming information reception unit configured to receive the streaming information, which has been transmitted by the streaming information transmission device to the first communication apparatus, by using the predetermined information.

REFERENCE SIGNS LIST

100 audio source machine
200, 300, 400, 500 audio receiver machine 202 streaming information reception unit
204 address information transmission unit
206 storage unit
208 operation input unit
302 streaming information reception unit
304 interception information reception unit
306 address information reception unit
308 storage unit
310 operation input unit

The invention claimed is:

1. A communication apparatus, comprising:
circuitry configured to:
receive, from a streaming information transmission device, timing information of frequency hopping operation for communication of streaming information;
receive the streaming information from the streaming information transmission device based on the timing information;
receive a user input;
set, based on the received user input, the communication apparatus as one of a base machine to which the streaming information transmission device connects or a client machine that intercepts the streaming information;
establish a connection with an interception device based on the setting of the communication apparatus as the base machine;
transmit an interception standby command to the interception device, wherein the interception standby command includes address information for identification of the streaming information transmission device by the interception device; and
disconnect the interception device from the base machine based on a response to the interception standby command from the interception device, wherein
the address information is transmitted based on the setting of the communication apparatus as the base machine,
the interception device intercepts the timing information from the streaming information transmission device based on the address information in the interception standby command, and
the interception device receives the streaming information based on the interception of the timing information.

2. The communication apparatus according to claim 1, wherein
the circuitry is further configured to transmit the address information to a plurality of interception devices based on the user input,
the plurality of interception devices corresponds to a group, and
the plurality of interception devices includes the interception device.

3. The communication apparatus according to claim 2, wherein the circuitry is further configured to:
store a list of the plurality of interception devices of the group; and
delete at least one interception device of the plurality of interception devices from the list based on drop out from the group by the at least one interception device.

4. The communication apparatus according to claim 1, wherein
the circuitry is further configured to transmit a link key for decryption of the streaming information, and the link key is transmitted with the address information to the interception device.

5. A method, comprising:
in a communication apparatus:
receiving, from a streaming information transmission device, timing information of frequency hopping operation for communication of streaming information;
receiving the streaming information from the streaming information transmission device based on the timing information;
receiving a user input;
setting, based on the received user input, the communication apparatus as one of a base machine to which the streaming information transmission device connects or a client machine that intercepts the streaming information;
establishing a connection with an interception device based on the setting of the communication apparatus as the base machine;
transmitting an interception standby command to the interception device, wherein the interception standby command includes address information for identification of the streaming information transmission device by the interception device; and
disconnecting the interception device from the base machine based on a response to the interception standby command from the interception device, wherein
the address information is transmitted based on the setting of the communication apparatus as the base machine,
the interception device intercepts the timing information from the streaming information transmission device based on the address information in the interception standby command, and
the interception device receives the streaming information based on the interception of the timing information.

6. A non-transitory computer-readable medium having stored thereon, computer-executable instructions which when executed by a communication apparatus, cause the communication apparatus to execute operations, the operations comprising:
receiving, from a streaming information transmission device, timing information of frequency hopping operation for communication of streaming information;
receiving the streaming information from the streaming information transmission device based on the timing information;
receiving a user input;
setting, based on the received user input, the communication apparatus as one of a base machine to which the streaming information transmission device connects or a client machine that intercepts the streaming information;
establishing a connection with an interception device based on the setting of the communication apparatus as the base machine;
transmitting an interception standby command to the interception device, wherein the interception standby command includes address information for identification of the streaming information transmission device by the interception device; and disconnecting the interception device from the base machine based on a response to the interception standby command from the interception device, wherein the address information is transmitted based on the setting of the communication apparatus as the base machine, the interception device intercepts the timing information from the streaming information transmission device based on the address information in the interception standby command, and the interception device receives the streaming information based on the interception of the timing information.

7. A communication apparatus, comprising:
circuitry configured to:
receive a user input;
set, based on the received user input, the communication apparatus as one of a base machine to which a streaming information transmission device connects or a client machine that intercepts streaming information;
establish a connection with a streaming information reception device based on the setting of the communication apparatus as the client machine;
receive an interception standby command from the streaming information reception device, wherein the interception standby command includes address information for identification of the streaming information transmission device;
disconnect the streaming information reception device from the communication apparatus, subsequent to transmission of a response to the interception standby command to the streaming information reception device;
intercept timing information from the streaming information transmission device based on the interception standby command, wherein the streaming information transmission device transmits the streaming information to the streaming information reception device; and
receive the streaming information from the streaming information transmission device based on the timing information.

8. The communication apparatus according to claim 7, wherein the timing information is related to a frequency hopping operation for communication of the streaming information.

9. The communication apparatus according to claim 7, wherein the circuitry is further configured to intercept the timing information from the streaming information transmission device based on the address information.

10. The communication apparatus according to claim 9, wherein
the streaming information reception device transmits the address information to a plurality of communication apparatuses based on the user input,
the plurality of communication apparatuses corresponds to a group, and
the communication apparatus is associated with the plurality of communication apparatuses.

11. The communication apparatus according to claim 10, wherein the circuitry is further configured to:
store participation information of the streaming information reception device as group participation information; and delete the group participation information of the streaming information reception device based on drop out from the group by the streaming information reception device.

12. The communication apparatus according to claim 9, wherein
the circuitry is further configured to receive a link key for decryption of the streaming information, and
the link key is received with the address information.

13. A method, comprising:
in a communication apparatus:
receiving a user input;
setting, based on the received user input, the communication apparatus as one of a base machine to which a streaming information transmission device connects or a client machine that intercepts streaming information; and
establishing a connection with a streaming information reception device based on the setting of the communication apparatus as the client machine;
receiving an interception standby command from the streaming information reception device, wherein the interception standby command includes address information for identification of the streaming information transmission device;
disconnecting the streaming information reception device from the communication apparatus, subsequent to transmission of a response to the interception standby command to the streaming information reception device;
intercepting timing information from the streaming information transmission device based on the interception standby command, wherein the streaming information transmission device transmits the streaming information to the streaming information reception device; and
receiving the streaming information from the streaming information transmission device based on the timing information.

14. A non-transitory computer-readable medium having stored thereon, computer-executable instructions which when executed by a communication apparatus, cause the communication apparatus to execute operations, the operations comprising:
receiving a user input;
setting, based on the received user input, the communication apparatus as one of a base machine to which a streaming information transmission device connects or a client machine that intercepts streaming information; and
establishing a connection with a streaming information reception device based on the setting of the communication apparatus as the client machine;
receiving an interception standby command from the streaming information reception device, wherein the interception standby command includes address information for identification of the streaming information transmission device;
disconnecting the streaming information reception device from the communication apparatus, subsequent to transmission of a response to the interception standby command to the streaming information reception device;
intercepting timing information from the streaming information transmission device based on the interception standby command, wherein the streaming information transmission device transmits the streaming information to the streaming information reception device; and receiving the streaming information from the streaming information transmission device based on the timing information.

15. A communication system, comprising:

a first communication apparatus that includes first circuitry configured to:
- receive, from a streaming information transmission device, timing information of frequency hopping operation for communication of streaming information;
- receive the streaming information from the streaming information transmission device based on the timing information,
- receive a user input,
- set, based on the received user input, the first communication apparatus as one of a base machine to which the streaming information transmission device connects or a client machine that intercepts the streaming information;
- establish a connection with a second communication apparatus based on the setting of the first communication apparatus as the base machine;
- transmit an interception standby command to the second communication apparatus, wherein the interception standby command includes address information for identification of the streaming information transmission device by the second communication apparatus; and
- disconnect the second communication apparatus from the base machine based on a response to the interception standby command from the second communication apparatus, wherein the address information is transmitted based on the setting of the first communication apparatus as the base machine, the second communication apparatus intercepts the timing information from the streaming information transmission device based on the address information, and the second communication apparatus receives the streaming information based on the interception of the timing information; and the second communication apparatus that includes second circuitry configured to:
- receive the interception standby command including the address information for the identification of the streaming information transmission device from the first communication apparatus;
- intercept the timing information from the streaming information transmission device based on the interception standby command; and
- receive the streaming information from the streaming information transmission device based on the timing information.

16. The communication apparatus according to claim 1, wherein the user input corresponds to a short pressing operation on an input button of the interception device.

17. The communication apparatus according to claim 2, wherein the circuitry is further configured to:
- disconnect from the streaming information transmission device in case the interception device has dropped out from the group; and
- execute a process to rejoin the interception device to the group prior to re-establishing connection with the streaming information transmission device.

* * * * *